Patented Sept. 12, 1922.

1,429,153

UNITED STATES PATENT OFFICE.

LESTER J. MALONE, OF ROCHESTER, NEW YORK, ASSIGNOR TO EASTMAN KODAK COMPANY, OF ROCHESTER, NEW YORK, A CORPORATION OF NEW YORK.

COMPOSITION AND FILM CONTAINING MIXTURES OF CELLULOSE ESTERS AND ETHERS.

No Drawing. Application filed January 7, 1922. Serial No. 527,717.

*To all whom it may concern:*

Be it known that I, LESTER J. MALONE, a citizen of the United States of America, residing at Rochester, in the county of Monroe and State of New York, have invented certain new and useful Improvements in Composition and Film Containing Mixtures of Cellulose Esters and Ethers, of which the following is a full, clear, and exact specification.

This invention relates to compositions and films containing mixed cellulose esters and ethers. One object of the invention is to provide a composition containing cellulose ethers admixed with one or more cellulose esters and by means of a common solvent, the latter preferably consisting wholly or in part of a single solvent substance of low volatility. Another object of my invention is to produce a viscous flowable composition which may be employed in the usual manufacturing methods for preparing films containing mixed cellulose ethers and esters. Still another object of my invention is to produce flexible, transparent films containing cellulose ethers and one or more cellulose esters. Other objects will hereinafter appear.

I have discovered how to combine cellulose ethers with one or more cellulose esters by means of a common solvent. I have found that pyridine either alone or mixed with volatile solvents or diluents can be used to combine the esters and ethers of cellulose. Since pyridine has a useful low volatility, it remains in films prepared from liquid compositions containing it and imparts useful properties to such films. Moreover, its solvent powers are such that thick viscous solutions can be prepared in which only from 400 to 600 parts of the common solvent are present for each 100 parts by weight of the mixed cellulosic compounds.

I will now describe purely by way of example several specific embodiments of my invention. I may dissolve 33 parts by weight of cellulose nitrate, 33 parts of acetone-soluble cellulose acetate and 33 parts of cellulose ether, such as water-insoluble ethyl cellulose, in from 400 to 600 parts of pyridine. This forms a viscous dope from which films can be prepared by spreading and partial evaporation of the pyridine. Such films are flexible and transparent. Instead of using equal parts of the three cellulosic ingredients, their relative proportions may be considerably varied; in fact, one of the esters may be omitted. Thus cellulose ether may be combined with cellulose nitrate (say, for instance, 50 parts of each) by dissolving them in 400 to 600 parts by weight of pyridine. An analogous mixture of cellulose ether and cellulose acetate may likewise be used.

When pyridine is used alone as the common solvent, the rate of setting and curing of the film,—that is, the evaporating of the pyridine fraction, which it is desired to remove, takes place slowly. In case of film manufacture by means of the customary methods, it is desirable that the evaporation take place more rapidly. I find that this can be accomplished by mixing the pyridine with varying proportions of one or more volatile ingredients, such as ethyl alcohol, methyl alcohol, ethyl acetate, methyl acetate, acetone, etc. While the proportions may vary considerably, I note, merely by way of giving one example, that the pyridine in the cellulose nitrate-acetate-ether dope formula described above may be replaced by a mixture of from 1 to 10 parts of ethyl alcohol with 99 to 90 parts of pyridine. When acetone, ethyl acetate or methyl acetate is used in combination with pyridine, the 90—10 parts by weight of such acetone or alkyl acetate may be used with 10—90 parts of pyridine and a good dope obtained.

Other substances which impart additional suppleness or incombustibility or other qualities to the film may then be added to the dope, such, for instance, as triphenyl or tricresyl phosphate, camphor, etc. Since, however, the pyridine remains in considerable amounts in the film, useful films may be prepared either where the pyridine alone is the only high boiler, or where additional substances of low volatility are present. It imparts flexibility to the film in which it remains.

The ingredients are of the ordinary commercial type sufficiently purified for the process of film manufacture, so as to give a dope yielding films having the proper relative freedom from color.

Having thus described my invention what

I claim as new and desire to secure by Letters Patent is:

1. A composition of matter including cellulose ether and a cellulose ester dissolved in a liquid comprising a substance which alone is a common solvent of said ether and ester, the combined weight of said cellulosic compounds being more than one-sixth of the weight of said liquid.

2. A composition of matter including cellulose ether and a cellulose ester dissolved in a liquid comprising pyridine, the combined weight of said cellulosic compounds being more than one-sixth the weight of said liquid.

3. A composition of matter comprising cellulose ether, cellulose nitrate, cellulose acetate, and a common solvent.

4. A composition of matter comprising cellulose ether, cellulose nitrate, cellulose acetate, and pyridine.

5. A composition of matter including cellulose ether and a cellulose ester dissolved in a liquid comprising both a substance which alone is a common solvent of said ether and ester and a volatile evaporation-accelerating substance.

6. A composition of matter comprising cellulose ether, a cellulose ester, pyridine, and a volatile evaporation-accelerating substance.

7. A composition of matter comprising cellulose ether and a cellulose ester combined by a liquid containing a common solvent compound.

Signed at Rochester, New York, this 22nd day of December, 1921.

LESTER J. MALONE.